United States Patent [19]

Umemoto

[11] 4,251,604
[45] Feb. 17, 1981

[54] BATTERY ASSEMBLY FOR ELECTRONIC TIMEPIECES

[75] Inventor: Toshio Umemoto, Koganei, Japan

[73] Assignee: Citizen Watch Co., Ltd., Tokyo, Japan

[21] Appl. No.: 34,501

[22] Filed: Apr. 30, 1979

[30] Foreign Application Priority Data

May 4, 1978 [JP] Japan .................................. 53/53348

[51] Int. Cl.³ ............................................. H01M 2/10
[52] U.S. Cl. ....................................... 429/98; 368/204
[58] Field of Search ...................... 429/96, 97, 98, 99, 429/100; 58/23 BA

[56] References Cited

U.S. PATENT DOCUMENTS

| 3,006,139 | 10/1961 | Hug et al. | 58/23 BA |
| 3,736,741 | 6/1973 | Paratte | 429/98 |
| 3,945,193 | 3/1976 | Yasuda et al. | 429/98 |

FOREIGN PATENT DOCUMENTS

| 1798363 | 2/1971 | Fed. Rep. of Germany | 58/23 BA |
| 374938 | 3/1964 | Switzerland | 58/23 BA |

Primary Examiner—Donald L. Walton
Attorney, Agent, or Firm—Sherman & Shalloway

[57] ABSTRACT

A battery assembly for electronic timepieces includes a frame and an electric battery supported in and securely fitted to the frame. The frame has a portion which acts to produce an engagement with a substrate of the timepiece to keep the battery in position.

8 Claims, 7 Drawing Figures

BATTERY ASSEMBLY FOR ELECTRONIC TIMEPIECES

BACKGROUND OF THE INVENTION

1. Field

This invention relates to a battery assembly for electronic timepieces, especially for wrist watches, which has an engaging surface to determine the position thereof to the watch.

2. Prior Art

In a conventional wrist watch, as illustrated in FIG. 1, an electric battery 1 is positioned in a recess 8 formed in a substrate 2 of the watch in such manner that a negative terminal 1a of the battery faces the bottom of the recess. A springy contact member 3 fitted to the substrate 2 contacts with the periphery of a positive terminal 1b of the battery 1 and presses it against the surface of an insulating plate 6, thereby ensuring the battery to be kept in position. A springy contact member 4 has a portion extending along the bottom surface of the recess and contacting the negative terminal 1a and another portion which is sandwiched between a printed circuit board 7 and the plate 6 to produce an electric connection between a negative terminal of the board and the negative terminal 1a. In order to electrically insulate the negative terminal 1a and the member 4 from the substrate 2, there is provided an insulating sheet 5. When the battery is kept in position, the flat surface of the negative terminal contacts with the insulating sheet to determine the position in the axial direction of the battery. A timepiece dial 9 is fitted to the substrate 2.

As noted from the conventional construction of FIG. 1, since the axial position of the battery 1 is determined by receiving the negative terminal 1a at the bottom of the recess 8, it is necessary that the substrate 2 should have a portion for acting as a stop at the bottom of the recess with a sufficient thickness to resist the force imparted directly or through the contact member 4 from the battery. If the mechanical strength at that portion of the substrate is low, then the substrate and dial plate would be deformed.

SUMMARY OF THE INVENTION

It is a primary object of this invention to provide a battery assembly which does not require that a substrate of a timepiece should have a receiving portion for a battery.

Another object of this invention is to provide a battery assembly which enables a timepiece to be small in thickness.

According to this invention, the battery assembly comprises a battery and a supporting frame therefor, which are securely fitted to each other in a predetermined relationship. The frame surrounds the battery and has a portion or surface which can engage with a stop provided in a recess of a substrate of a timepiece, when the assembly is inserted in the recess. Namely, the position of the battery is determined by an engagement between the engaging surface of the frame and the stop of the substrate at the periphery of the recess. This means that it is not necessary that the substrate should have any wall at the bottom of the recess, thereby enabling that the entire thickness of the timepiece can be reduced.

DESCRIPTION OF THE PREFERRED EMBODIMENT

Figure 1:
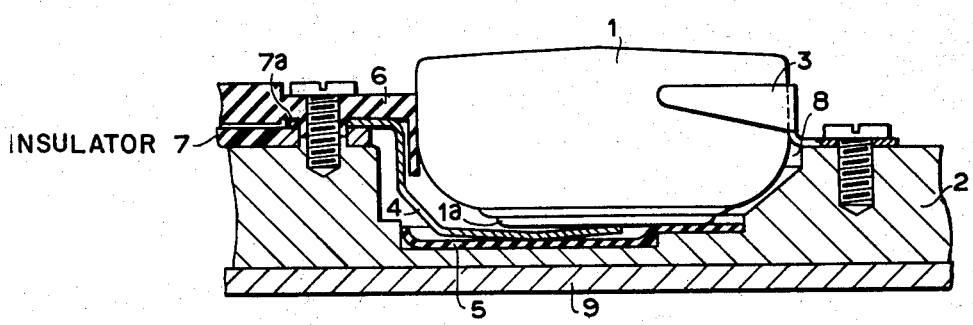
FIG. 1 is a sectional view showing a battery and a holding mechanism therefor employed in a conventional wrist watch.
Figure 2:
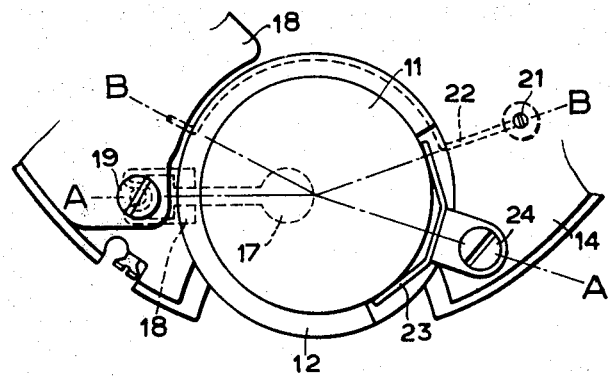
FIG. 2 is a plan view of a battery assembly embodying this invention and a holding mechanism therefor.
Figure 3:
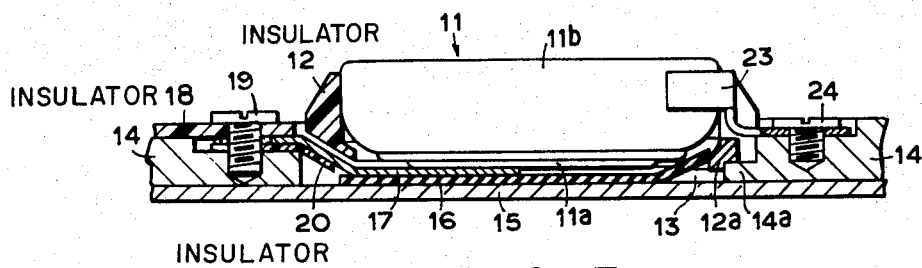
FIGS. 3 and 4 are sectional views taken along the lines A-A and B-B of FIG. 2, respectively, in an enlarged scale.
Figure 4:
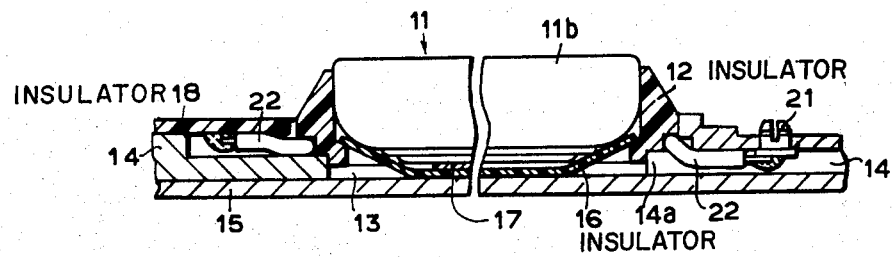

In an embodiment shown in FIGS. 2 to 4, use is made of a battery assembly comprising a conventional electric battery 11 and a supporting frame 12. The frame is shaped generally in a ring having a central bore through which the battery is inserted and securely fitted to the frame by means of, for example, adhesion. At one end of the frame is formed an engaging portion 12a to form a first surface disposed in parallel with the surface of the periphery of the battery and a second surface disposed in a plane perpendicular to the first surface.

A mechanism for receiving and holding the battery assembly includes a hole 13 formed in a substrate 14 of a wrist watch and bottomed by a dial plate 15 to provide a recess. The substrate 14 has a portion which extends inwardly from the periphery of the hole to form a cylindrical stop 14a into which the engaging portion 12a of the frame 12 can be inserted. Therefore, when inserted into the recess as shown in FIGS. 3 and 4, the battery assembly cannot be moved in the direction toward the dial plate 15 and also in the direction perpendicular to the axis of the frame.

It is important that the battery 11, which has a negative terminal 11a and a positive terminal 11b, and the frame 12 be combined in such manner that the top surface of the negative electrode and the engaging portion 12a are held in a predetermined relationship. That is, in the state that the frame is engaged with the stop 14a of the substrate, the top surface of the negative electrode is arranged in parallel to the back surface of the dial plate 15 with a predetermined distance therebetween. The space between the dial plate and battery is used for enclosing an insulating member 16 and a lead plate 17. An end portion of the lead plate 17 extends out of the recess and is sandwiched between the substrate 14 and a printed circuit board 18 by means of screw 19 to provide an electrical connection with a terminal of the board 18. An insulating sheet 20 extends between the lead plate 17 and the substrate 14. To a reset terminal of the board 18 is connected a reset pin 21 through a lead wire 22 which extends in a groove formed in a periphery of the frame 12.

A springy contact member 23 is secured at its one end to the substrate 14 by means of a screw 24 and has a portion facing the peripheral surface of the positive electrode 11b and pressed thereto by its resiliency, thereby connecting the positive electrode of the battery 11 to the substrate 14 and also holding the battery assembly in position.

Figures 5A, 5B:
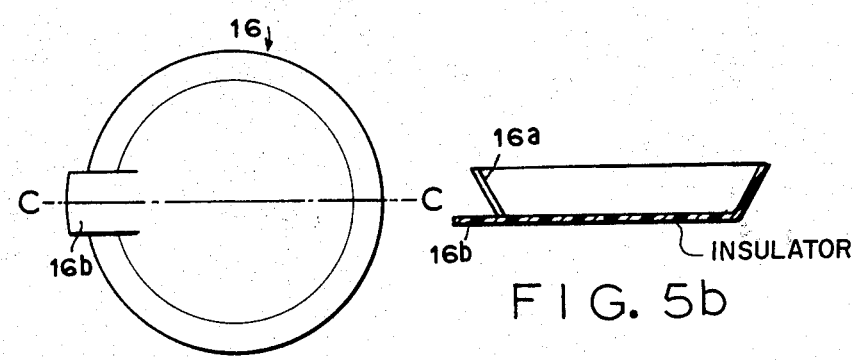
FIG. 5(a) is a plan view showing an insulating member used in the mechanism of FIGS. 2 to 4.
FIG. 5(b) is a section along the line C-C of FIG. 5(a)
Figure 6:
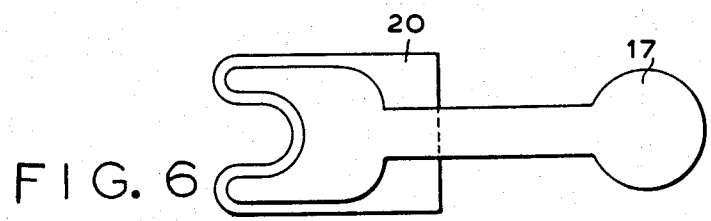
FIG. 6 is a plan view of a lead plate with an insulating plate employed in the mechanism.

In FIGS. 5a and 5b is shown the insulating member which has a plate-like configuration having a cut-out 16a through which a lip 16b extends. The cut-out 16a provides a passage into which the lead plate 17 and insulating sheet 20 are inserted. The configuration in plan of the lead plate 17 and insulating sheet 20 will be clear from FIG. 6.

The lead plate 17 may be connected at one end to the negative terminal 11a of the battery by means of electroconductive soldering or welding. In this case, it is not necessary that the lead plate 17 has resiliency to form an ohmic contact with the negative terminal 11a, resulting in reducing the space between the battery 11 and the dial plate 15. Removal of the battery assembly can be done by loosing the screw 19. If desired, the contact member 23 may be firmly connected to the battery.

As has been described hereinbefore, the battery assembly according to this invention can easily be placed at a predetermined position, if the battery 11 is fitted to the frame 12 in a fixed relationship. Determination of the position of the battery to the frame may be facilitated by using a suitable jig. Once the battery assembly has been held in position, any impact from the outside will not affect the dial plate to damage or deforem it, because the impact would be absorbed by the substrate 14. Therefore, there is no need that the substrate 14 has a portion positioned in the bottom of the recess to receive the force from the battery, resulting in reduction of the distance between the battery and dial plate and in turn of the entire thickness of the timepiece.

Apparently, utilization of the lead plate 17 integrally connected to the battery 11 is a factor for providing a timepiece with a further reduced thickness, and also eliminates the possibility of insufficient contact therebetween. Of course, the connection between the lead plate 17 and the battery 11 by soldering or welding will not be affected by the influences of the electrolyte which may leak out of the battery. Even if an amount of electrolyte comes out, it will produce crystals or other solid materials in the region bounded by the insulating member 16 and the frame 12, and does not damage or discolor the dial plate 15.

In case that the insulating member 16 has such construction as illustrated in FIGS. 5a and 5b and is formed of a plastics material, it can be assembled with the battery 11 and the frame 12. The assembly thus formed will eliminate a dangerous occurrence of short circuiting owing to a wrong operation wherein any insulating member is not employed.

What is claimed is:

1. A battery assembly for electronic timepieces comprising:
    a battery having a positive terminal with a cylindrical surface and a negative terminal with a top surface disposed in a plane perpendicular to the axis of the positive terminal;
    (b) means for simultaneously positioning said assembly and for providing electrical connection to said battery, comprising:
       (1) a supporting frame having a central bore through which the battery is inserted in such a manner to be securely fitted to the frame;
       (2) a lead plate having an end securely fitted and electrically connected to the negative terminal of the battery; and
       (3) an insulating member supported by the frame and disposed to cover the negative terminal and the lead plate;
       (4) the supporting frame being provided with an engaging portion which is engaged with a stop of a substrate of the timepiece for preventing a dial plate of the timepiece from being depressed by the battery through the insulating member.

2. The battery assembly as defined in claim 1 wherein the engaging portion has a first surface disposed in parallel with the surface of the positive terminal and a second surface disposed in a plane perpendicular to the first surface.

3. The battery assembly as defined in claim 1 wherein said lead plate has a free end, and an insulating sheet is attached to the free end portion of the lead plate.

4. The battery assembly as defined in claim 1 wherein the insulating member includes a cut-out portion, the lead plate extending through said cut-out portion.

5. The battery assembly as defined in claim 1 wherein a marginal portion of the insulating member is disposed between the battery and the supporting frame.

6. The battery assembly as defined in claim 1 wherein the substrate of the timepiece includes a through-hole for accommodating said assembly.

7. The battery assembly as defined in claim 6 wherein said through-hole is dimensioned for receiving at least the entire cylindrical surface of said battery positive terminal.

8. A battery assembly for electronic timepieces comprising:
    (a) a battery having a positive terminal with a cylindrical surface and a negative terminal with a top surface disposed in a plane perpendicular to the axis of the positive terminal;
    (b) a supporting frame having a central bore through which the battery is inserted in such manner as to be securely fitted to the frame;
    (c) a lead plate having an end connected to the negative terminal;
    (d) a contact member extending through a cut-out portion of the supporting frame and contacting the positive terminal of the battery;
    (e) the supporting frame being provided with an engaging portion which has a first surface disposed in parallel with the surface of the positive terminal and a second surface disposed in a plane perpendicular to the first surface and engaging with a stop of a substrate.

* * * * *